United States Patent
Thrasher et al.

(10) Patent No.: US 7,890,860 B1
(45) Date of Patent: Feb. 15, 2011

(54) METHOD AND APPARATUS FOR MODIFYING TEXTUAL MESSAGES

(75) Inventors: Russell Thrasher, Mebane, NC (US); Abhijit Muthiyan, Cary, NC (US)

(73) Assignee: Symantec Operating Corporation, Cupertino, CA (US)

( * ) Notice: Subject to any disclaimer, the term of this patent is extended or adjusted under 35 U.S.C. 154(b) by 1148 days.

(21) Appl. No.: 11/540,819

(22) Filed: Sep. 28, 2006

(51) Int. Cl.
*G06F 17/30* (2006.01)

(52) U.S. Cl. .............................. 715/260; 707/E17.094

(58) Field of Classification Search .................. 715/210, 715/234, 260; 707/E17.094
See application file for complete search history.

(56) References Cited

U.S. PATENT DOCUMENTS

| | | | |
|---|---|---|---|
| 5,978,820 A * | 11/1999 | Mase et al. | 715/210 |
| 6,961,878 B2 * | 11/2005 | Kirkpatrick et al. | 714/57 |
| 2003/0021397 A1* | 1/2003 | Wengrovitz | 379/93.15 |
| 2005/0004928 A1* | 1/2005 | Hamer et al. | 707/100 |

* cited by examiner

*Primary Examiner*—Creighton Smith
(74) *Attorney, Agent, or Firm*—Hunton & Williams LLP

(57) ABSTRACT

A method and apparatus for modifying the context of messages based on a selected rule set are provided. The method comprises selecting a rule set from the database, scanning the message while comparing content of a textual message to the rule set, and determining textual modifications to the textual message based on the selected rule set to define a modified message having content that is different from the textual message.

17 Claims, 3 Drawing Sheets

METHOD AND APPARATUS FOR MODIFYING TEXTUAL MESSAGES

BACKGROUND OF THE INVENTION

1. Field of the Invention

The present invention generally relates to textual message delivery systems and more particularly to a method and apparatus for modifying textual messages.

2. Description of the Related Art

There was a time when people wrote letters to each other and the letters were civil and respectful. Most letters were well thought through and tone was very important because the wrong letter tone could end a relationship. Communications were so slow, it was nearly impossible to correct a faux pas in a timely manner, once the letter was mailed. When someone was angry, they might write an angry letter and plan to mail it, but after a time, when the anger had subsided, they would re-think their letter and not send it. If the writer was really angry, they might prepare the letter for the postman and while handing it to him, decide not to send it. They can even write a new, more constructive letter, that achieves a positive outcome, rather than the inevitable "no-one-wins" outcome the first letter would most likely have sowed.

Times have changed from when postal mail ("snail-mail") was the only communication method available to everyone. Today, phones, e-mail, internet blogs, voice messaging, text messaging, instant messaging, over-night mail, international over-night mail, cell-phones, and other communications devices provide access to nearly instant communications. Once a message is complete, the message is sent and almost instantly received by its recipients. There is no way to stop it. Once it's gone, it's gone.

With all the available communications options, one might conclude the world is a better place. On the other hand, communications is a tricky business that requires time to consider tone and purpose. Quick communications does not necessarily mean well received communications. Many a user have experienced sending, for example, an e-mail, and unintentionally flaming one of the recipients because of the way the language in the e-mail is interpreted by the receiver. Sometimes unintended emphasis is placed on the selection of words or the sentence structure. In other examples, adjective choice, clause combinations, or even poor sentence structure and mechanics can lead to double meanings or unintended emphasis on certain words. Many users have experienced these types of problems, where a message is misunderstood or its content is socially inappropriate, leading to lengthy e-mail barrages that can take hours to straighten out, cause unneeded stress, and in some circumstances lead to a complete breakdown in communications.

There are in the industry, examples of some attempts to correct problems with written communications. Several software providers offer spelling checker engines and grammar checker engines that have, to some level, improved communications between senders and receivers. These engines use rules sets based on established spelling and grammar rules for the given languages. However, there seems to be no checkers available for identifying and fixing flame mail, or hurtful language, or unintended consequences, or projecting the wrong personality, or any other number of un-desired contextual issues that users can wish to modify before a message is sent or, in the alternative, after it is received from a third party.

There is a need, therefore, in our fast paced, communications based society to identify textual communications that include unintended consequences before the communication is sent.

SUMMARY OF THE INVENTION

A method and apparatus for scanning and selectively modifying a textual message are provided. In one or more embodiments, the method includes selecting a first rule set from a database of contextual rule sets, scanning the message while comparing the content of the textual message to the first rule set, and identifying textual modifications for the textual message based on the first selected rule set to define a first modified message.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
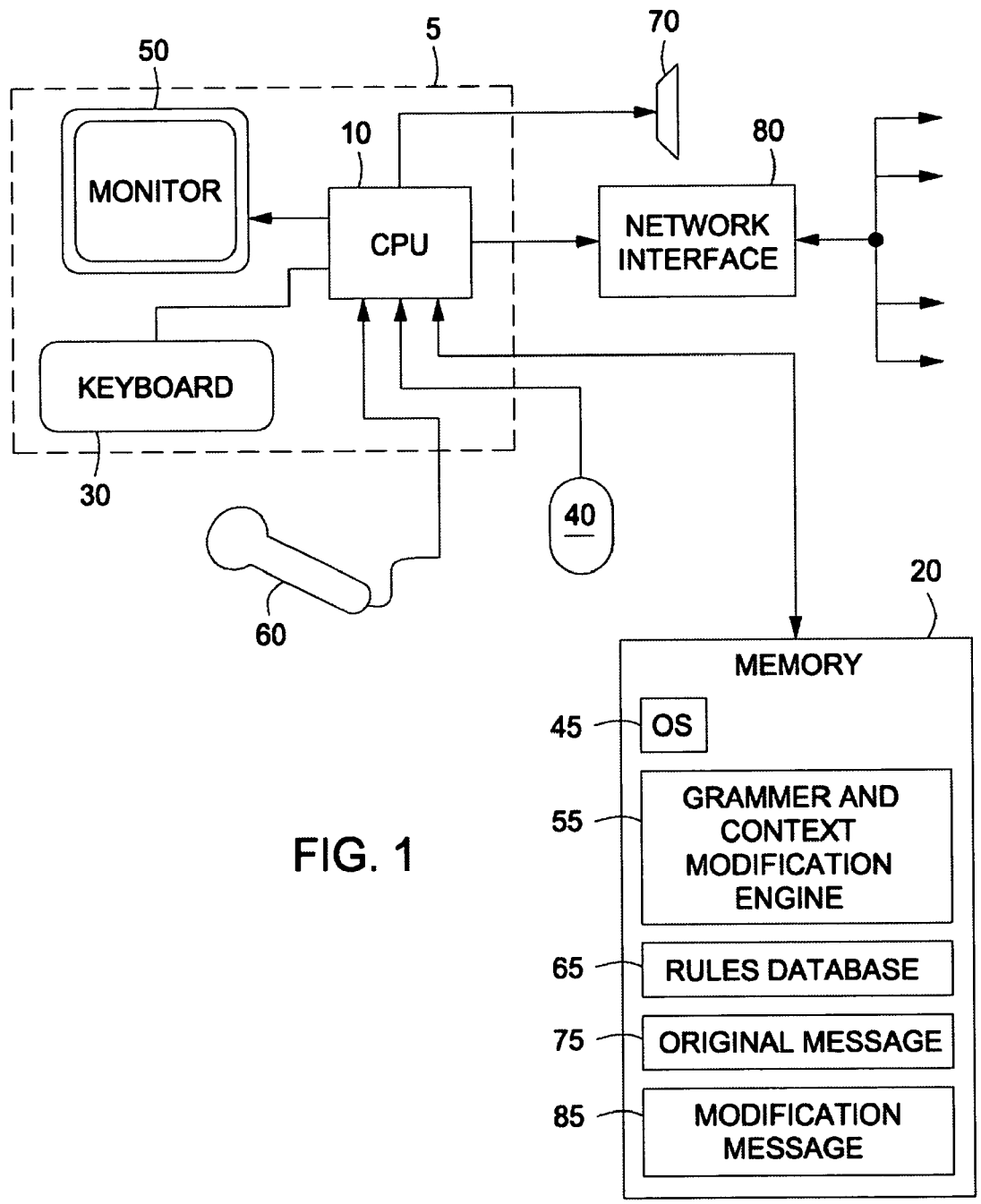
FIG. 1 depicts a representative computer system used to facilitate operation of the present invention.

FIG. 1 depicts a representative computer system that can be used to perform at least one embodiment of the present invention. Those skilled in the art will understand that there are many computer systems configurations and variations and it should be understood that the computer system 5 presented in FIG. 1 is not meant to limit the configurations within which the many embodiments, as described below, can be employed. In one or more embodiments of the invention, the computer 5 includes a central processing unit 10, a memory 20, a keyboard 30, a mouse 40, and a monitor 50, on which a software package according to one or more embodiments described can be executed. The computer 5 may include a microphone 60 and a speaker 70 for universal access and voice recognition or commanding. The monitor 50 can be touch sensitive to facilitate information entry and manipulation. The computer system 5 may interface with external databases or the internet via network interface 80. It should be understood that the term "network interface" does not indicate a limitation to interfaces that use only Ethernet connections and refers to all possible external interfaces, wired or wireless.

It should be noted that even though the computer system 5 is shown as a platform on which the methods described can be performed, the methods described can be performed on any platform with processing capabilities where textual messages are created, sent, or received. In one or more embodiments, the messages can be sent or received on, for example and for illustrative purposes, Instant Messaging services, e-mails, internet BLOGs, web-sites, web-sites using HTML format, plain text web-sites, chat rooms, or any resource on which textual messages can be created, sent, or received. Other devices, other than a computer system, the present invention can operate on include but are not limited to, computer servers, distributed computer networks, hand held PCs, cellular phones, hand held music players, pagers, hand-held devices known by the Trademark names Palm or Blackberry, or any other device or system upon which messages are created, sent, or received.

Referring again to FIG. 1, computer programs can be stored in memory 20 and the central processing unit 10 works in concert with at least one memory 20, an input device 30 and an output device 50 to perform tasks for the user. The memory 20 includes any number and combination of memory devices, without limitation, as is currently available or can become available in the art. For example, the memory device can include without limitation, and for illustrative purposes only: hard drives, disk drives, random access memory, read only memory, electronically erasable programmable read only memory, flash memory, thumb drive, and any other memory device. Those skilled in the art are familiar with the many variations that can be employed using memory devices and no limitations should be imposed on the embodiments herein due to memory device configurations and algorithm prosecution techniques.

The memory 20 comprises an operating system (OS) 45, a grammar and content modification engine 55 and a rules database 65. The engine 55 uses rules from the rules database 65 in accordance with the present invention to modify an original textual message 75 to define modifications that can be used to prepare a modified message 85.

Figure 2:
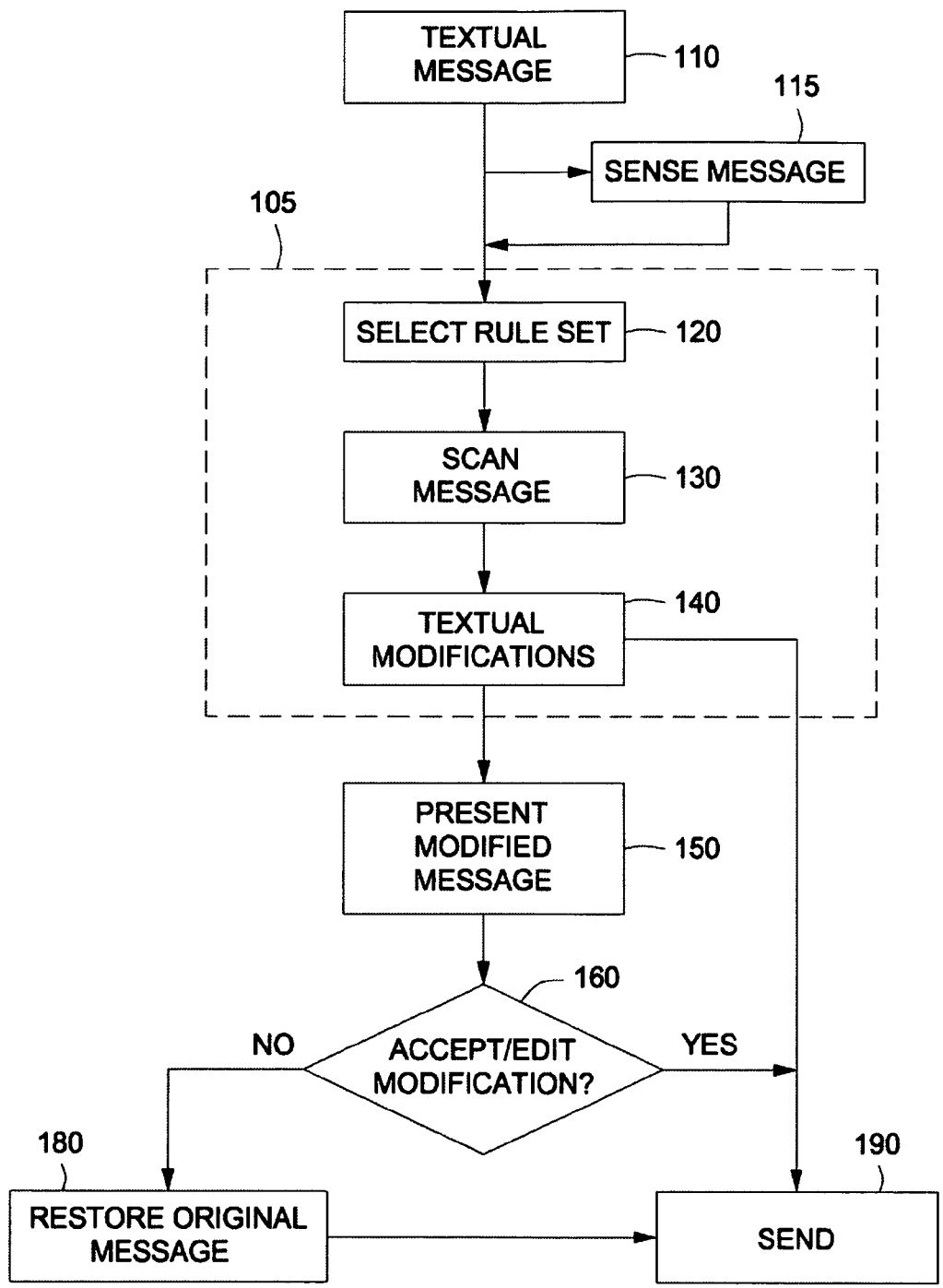
FIG. 2 depicts an illustrative flow diagram for scanning and selectively modifying a textual message in accordance with one embodiment of the invention.

FIG. 2 depicts an illustrative flow diagram for scanning and selectively modifying a textual message in accordance with one embodiment of the invention. At step 110, a textual message is provided for contextual scanning and manipulation. At step 120, a database of contextual rule sets is provided and a user selects a rule set on which contextual modifications are to be based. The message is scanned using a grammar and content modification engine at step 130. The engine determines textual modifications or substitutions at step 140 based on the selected rule set and the message. The engine may use the modifications to prepare a modified message. If a modified message is prepared, the modified message is presented to a user at step 150. The user may then accept or reject the modifications at step 160. The user may be presented with the original message and then the user may elect to prepare a modified message, or the modified message may be prepared automatically and presented. Depending upon the user's decision, the original message is either restored at step 180 then sent at step 190, or the modified message is sent at step 190. The user may, of course, choose not to send the modified message or the original message.

The foregoing description assumes that the user is composing a message to be sent in a modified form. However, the embodiment can be used to modify textual messages that are received from another such that the displayed message always takes on the contextual characteristics desired by the user. The user can then respond to the modified message as outlined above or end the conversation.

In one or more embodiments of the invention, the grammar and content modification engine 55 of FIG. 1 is a modified grammar engine, programmed to accept rule sets consistent with the rule sets for the one or more embodiments disclosed herein. Alternatively, the engine may be a custom engine 55, written to scan messages and modify the message in accordance with a selected rule set 65. In other embodiments, a virus scanning package may include a grammar and content modification engine. Since some virus scanning programs scan message text for viruses, while the virus scan is scanning the message text for viruses, the engine modifies all messages using a selected rules set. In other embodiments, the engine may be provided by a third party vendor as a stand alone software package or as a plug-in to a larger package, e.g., e-mail software, virus scan software, grammar/spell checker and the like.

A rule set is selected at step 120 when a user selects a rule from a selectable list of rules. Users may be limited to one rule set by a third party, such as a supervisor, even though there can be many available rule sets. In other embodiments, the rule sets are selected automatically and randomly from a database of rules sets.

Methods for providing a textual message are almost limitless. In one or more embodiments, messages are created by a user, or messages are received by the user from a third party. In embodiments where the message is received from a third party, a user can prevent all messages from being presented until the message has been modified according to a pre-selected rule set. Here, the message availability for processing is sensed at step 115, modified using a pre-selected rule set with a content modification engine, and presented to the user only after modification. In one or more embodiments, the original message is held or saved (step not shown) and the user can access (e.g., display) the original message along with the modified message. Automatically modifying all messages before they are received helps some users make sure they never receive a message with an undesired attitude or tone, e.g., removing a bad attitude or angry tone. The user generally sets a preference in the content modification engine to modify messages from specific senders using a pre-specified rule set. In one example use for these embodiments, the user can receive messages from particular senders who use slangs, abbreviations, vulgar language, cryptic-instant messaging like terms, and colloquialisms. Here, the user would identify certain individuals whose messages they wish to have modified, select an associated preferred rule for those individuals, sense the arrival of the messages based upon, for example, e-mail addresses or other identifiers, and then modify the messages to remove (alter) all the unwanted language, replacing the original message with a message modified to meet a user's desires. The original messages may be saved for retrieval.

In another embodiment of the invention, the message is received and processed on a server system before it is presented to any recipients. After receiving the message, a grammar and content modification engine resident on the server scans and modifies the message, based on a pre-set rule set, prior to the message ever being read by a message recipient, then sends the message to its intended recipients. Using this approach allows a message with a "bad attitude" from permeating an organization. In a similar manner, text messages may be intercepted and modified before they are displayed on a given recipient's text messaging device. Other example embodiments receive and modify, based on pre-set rule sets, chat-room messages, bulletin board messages, message posts sent to personal electronic web-sites such as the web-sites available on the product with the trademark name My Space, or any message from any source.

In other embodiments, after the engine makes the textual substitutions at step 140, the suggested substitutions are presented to the user at step 150. After being presented with a modified message at step 150, a user accepts or edits the modified message at step 160 and sends the message at step 190. Each individual suggested change within a modified document may be either accepted or rejected by the user using various methods understood in the art. The user may further accept some suggested modifications, reject others, and further edit the message before sending. Alternatively, after being presented with a modified message at step 150, a user may reject the modified message at step 160, restore the original message at step 180, and send the original message at step 190. Optionally, the original message is saved, before modification, for later recall. In another embodiments, the user is not allowed to reject the suggested changes, for example, when a corporation mandates a given tone in all its messages. As such, the modified message is automatically sent at step 190 without presenting the recommended modifications to the user.

In one or more embodiments of the invention, sending the message comprises saving the modified message to a memory. Alternatively, sending the message includes, for example, printing, e-mailing, transferring, or texting the modified message for presentation to a recipient or recipients. The word "recipient" includes persons and systems, as not all messages are sent to a "person," some are sent to, for example, a web-site, chat room, multiple person distribution list, electronic bulletin board, or even voice recognition system for conversion from text to verbal expression by a text to voice engine to support universal access or other verbal communication outputs.

In one or more embodiments, providing a textual message at step 110 and scanning and modification at step 130, occur in real-time while a user is creating the message. In one or more other embodiments, the suggested modifications are then presented to the user, using various presentation methods, in real-time. Here, real time processing based on a selected rule set occurs much like spell checkers perform real time spelling checks and grammar checkers perform real time grammar checks, techniques that are understood in the art. It should be noted that the term "real-time" is not meant to signify any actual time limitations on the present invention, only to suggest that the suggested modifications are presented to the user, in some cases, as they are creating the message and without direction from the user.

In one or more embodiments, presentation is made by displaying the modified message to a user. In such embodiments, the modifications made to the original message may be highlighted such that the user can view all the changes. Furthermore, the original text that the content modification engine suggests should be changed is highlighted and "pop-ups" or windows are shown above the highlighted text, the pop-ups containing the suggested changes. In one or more embodiments of the invention, a separate window is generated, using methods understood in the art, where one sub-window contains a highlighted version of the original text and a second sub-window contains suggested changes to the text. The separate window may also contain a textual explanation as to why the suggested changes are suggested. In still further embodiments, the presentation method includes changing the text as the user creates a message without highlighting the changes. The presentation method may also include changing the text as the user creates a message, the changed text being highlighted.

Rule sets define rules and provide replacement terms for use by the grammar and content modification engine to change a given message, using techniques known in the art for grammar checking engines. In one or more embodiments, the rule sets include rules for the content modification engine to compare adjectives found in a message and make substitutions from a database of substitute terms and phrases based on other rules within the set. The content modification engine analyzes sentence structure, clauses, and sentence length to make modifications based on the selected rule set. The content modification engine may add additional sentences, modify sentence structures, and modify other constructs in accordance with a selected rule set. Rule sets can be created to modify a message to change the message's tone. The rule sets are generally created to modify messages such that they meet a given set of cultural expectations. In other embodiments, rule sets are created to modify messages as if the message was created by a given personality.

Tonal sets, in one or more embodiments, include but are not limited to, among other sets, friendly, cordial, polite, thankful, apologetic, funny, sympathy, business formal, business informal, urgent, or any other message tone that can be created using language and contextual conscript rules as is understood by those with skill in the language arts.

Cultural expectation rule sets may also be used that include language and contextual conscript rules associated with any given culture. For example, one rule set can be used for changing a message written by an author wishing to communicate with a Japanese recipient, while another rule set might be used for communication with an Ethiopian. In these examples, if the original message is sent without correction for cultural expectation and even if both receivers can read and understand the language the original message is written in, the receivers can have cultural expectations that cause the receivers to perceive the message differently from each other. If the message is written in each recipient's language, the modification engine can be used to check the message's tone and cultural expectations using rules written for the language in which the message is written. It should be noted that the many and varied embodiments herein described can be employed by users regardless the language a textual message is written in as long as the rule sets take into account the language in question.

In another embodiment, personality rule sets are created using rules associated with various characters or personalities. The rule sets are employed to change a message from its original content such that a reader would conclude the writer is a sports junkie, or tennis fan, or baseball fan, or bird watcher, or any role that the user can wish to take on.

Rule sets can be developed using many techniques. For example, the rules sets are created using writing style manuals to define the rules for a given set and translating those rules into rules that are executable on any given device upon which the many embodiments of the present invention are hosted. This technique is similar to the technique used for grammar engines where established rules are used to create the rule set implemented by the engine to suggest corrections to grammar within a message. For one or more embodiments, where rules for cultural expectations are defined, those rules are translated into rules usable by a given device. For still further embodiments, where there are rules for creating given message tones in a textual message, those rules are translated into rules usable by a given grammar and content modification engine. The rule sets may be provided by a third party vendor for use by the engine. As such, the content modification engine and the rules may be provided by different vendors.

Where there are no established rules, there are multiple means for creating appropriate rules for tonal quality, cultural expectations, or characters. In one or more embodiments, rules are developed by scanning many actual messages using data mining techniques to find examples of both good and bad message tones, using those examples to populate rule sets to assist in identifying "tones" that should be "fixed." One such technique is to employ persons to develop rule sets for each particular desired selectable rule set used by the embodiments of the present invention. These rules are then translated into rule sets the grammar and content modification engine can implement. Another technique is to work with professional societies, that are interested in textual communications, to develop given rule sets.

The rule sets are generally updateable to incorporate new tones, cultural expectations, and roles rules. Updates may be performed using live updateable engines, performed via user initiated internet down-loads, performed via hardware connected directly to the given device upon which the one or more embodiments of the present invention are hosted, and/or performed by the user, who enters their preferences into a given rule set using methods understood in the art. The user's rule set preferences are generally held in user preference files.

Figure 3:
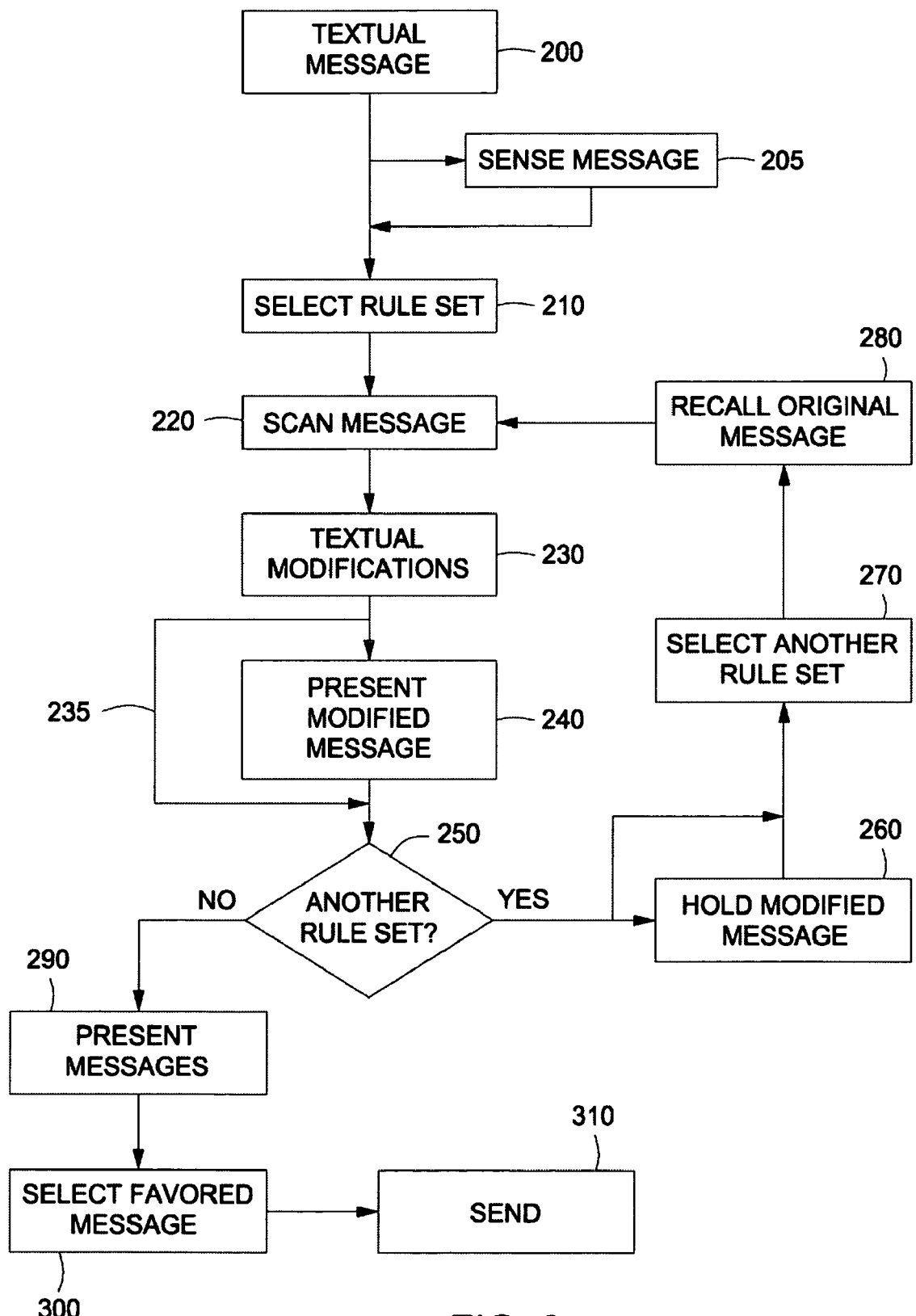
FIG. 3 depicts a flow diagram of various possible embodiments for comparing rule set outcomes in accordance with one embodiment of the invention.

FIG. 3 depicts a flow diagram of various possible embodiments for comparing rule set outcomes, where a user can compare modified messages based on multiple selected rule sets. In one example embodiment, a textual message is provided at step 200, a user selects a first rule set at step 210 and the message is modified based on the first selected rule at steps 220 and 230.

In one or more embodiments, the textual message is automatically sensed at step 205. The first modified message is presented to the user at step 240 and the user is asked if they would like to select another rule set at step 250. In one or more embodiments, the first modified message is not displayed at step 235 to the user until after at least two rule sets have been selected. Here, at least two modified messages are shown to the user at the same time. If the user decides to end the process after choosing only one rule set, they can choose to accept the modifications, restore the original message, or modify it as they see fit, as described in the one or more embodiments from FIG. 2 above. If the user decides to choose another rule at step 270, to see the effect of another rule set on the original message, the original message is recalled at step 280, using methods understood in the art, and modified at steps 220 and 230, using the selected rule.

When a user decides to discontinue choosing rule sets, a favored message is selected at step 300 by the user from the original message and the last modified message. The favored message is then sent, as described in one or more embodiments above, to a given recipient or recipients. The first modified message may be held or saved in memory at step 260 and after modifying the original message, using a second rule set, the two modified messages are presented to the user at step 290 so the user can compare at least the two outcomes. After comparing outcomes, the user selects a favored message at step 300 from the two modified messages and the original message, or modifies one of the messages as he sees fit, and sends the message at step 310. There is no limit to the number of rule comparisons that a user can undertake. There is also no limit to how the modified messages can be presented.

In one or more embodiments, modified messages are presented side-by-side. In other embodiments, the original message is presented along with all modified versions of the same message. In further embodiments, the first message modified by the first rule set is presented simultaneously with the first message modified by the second rule set, allowing the user to perform a "side-by-side" comparison of the two outcomes. Simultaneous side-by-side comparisons may be preformed using the output from three or more rule set selections, where the multiple outputs may be presented in multiple, selectable windows displayed on the output source of the given device upon which the message modifications are performed.

While the foregoing is directed to embodiments of the present invention, other and further embodiments of the invention may be devised without departing from the basic scope thereof, and the scope thereof is determined by the claims that follow.

The invention claimed is:

1. A method for scanning and selectively modifying a textual message to alter a context of the textual message comprising:
    selecting a rule set from a database of contextual rule sets using a computer;
    scanning a textual message using the computer while comparing content of the textual message to the rule set wherein the textual message is sent to or received from a third party, and wherein the scanning process occurs during a sending or receiving process; and
    determining textual modifications for the textual message using the computer based on the selected rule set to define a modified message having a content that is different from the textual message.

2. The method of claim 1 wherein the textual modifications are used to create the modified message.

3. The method of claim 1 wherein the rule set is a particular tonal rule set from a set of tonal rule sets.

4. The method of claim 1 wherein the rule set is a particular cultural expectations rule set from a set of cultural expectations rule sets.

5. The method of claim 1 wherein the rule set is a particular character rule set from a set of personality role rule sets.

6. The method of claim 1 wherein the textual message is authored by a user.

7. The method of claim 1 wherein the scanning and determining steps occur while the textual message is being created.

8. The method of claim 7 further comprising:
    presenting textual modifications to a user in real-time.

9. The method of claim 2 further comprising:
    presenting the modified message to a user;
    performing at least one of accepting at least a portion of the textual modifications or rejecting a portion of the textual modifications;
    using the accepted textual modifications to create the modified message; and
    sending the modified message.

10. The method of claim 9 wherein the presenting step further comprises:
    displaying the modified message containing the textual modifications as highlighted text within the textual message.

11. The method of claim 9 wherein the presenting step further comprises:
    displaying a list of suggested textual modifications.

12. Apparatus for scanning and selectively modifying a textual message comprising:
    a database of contextual rule sets;
    means for selecting a first rule set from the database;
    a grammar and content modification engine for scanning a textual message and determines textual modification for the textual message based on the selected rule set, wherein the textual message is sent to or received from a third party.

13. The Apparatus of claim 12 wherein the grammar and content modification engine alters the textual message to include the textual modifications and create a modified message.

14. The apparatus of claim 12 wherein the rule set is a particular tonal rule set from a set of tonal rule sets.

15. The apparatus of claim 12 wherein the rule set is a particular cultural expectations rule set from a set of cultural expectations rule sets.

16. The apparatus of claim 12 wherein the rule set is a particular character rule set from a set of personality role rule sets.

17. The apparatus of claim 12 wherein the textual message is authored by a user.

* * * * *